(12) United States Patent
Wang

(10) Patent No.: US 11,650,146 B2
(45) Date of Patent: May 16, 2023

(54) SPECIMEN INSPECTION MACHINE AND OPERATION METHOD THEREOF

(71) Applicant: Wistron Corp., New Taipei (TW)

(72) Inventor: Chen-Fa Wang, New Taipei (TW)

(73) Assignee: WISTRON CORP., New Taipei (TW)

( * ) Notice: Subject to any disclaimer, the term of this patent is extended or adjusted under 35 U.S.C. 154(b) by 400 days.

(21) Appl. No.: 16/853,873

(22) Filed: Apr. 21, 2020

(65) Prior Publication Data

US 2021/0208061 A1 Jul. 8, 2021

(30) Foreign Application Priority Data

Jan. 6, 2020 (TW) .................................. 109100267

(51) Int. Cl.
*G01N 21/35* (2014.01)
*G01N 21/88* (2006.01)

(52) U.S. Cl.
CPC ......... *G01N 21/35* (2013.01); *G01N 21/8806* (2013.01); *G01N 2021/8867* (2013.01)

(58) Field of Classification Search
CPC ............... G01N 21/35; G01N 21/8806; G01N 2021/8867
See application file for complete search history.

(56) References Cited

U.S. PATENT DOCUMENTS

| 6,184,526 B1 * | 2/2001 | Kohama | H01J 37/28 250/397 |
| 2002/0117619 A1 * | 8/2002 | Gunji | H01J 37/28 250/307 |
| 2004/0164244 A1 * | 8/2004 | Hiroi | H01J 37/28 250/310 |
| 2008/0078933 A1 * | 4/2008 | Watanabe | H01J 37/265 250/307 |
| 2010/0068824 A1 * | 3/2010 | Kimura | G01N 33/54373 422/68.1 |

(Continued)

FOREIGN PATENT DOCUMENTS

| CN | 201697924 U | * | 1/2011 |
| CN | 201697924 U | | 1/2011 |

(Continued)

*Primary Examiner* — Blake C Riddick
(74) *Attorney, Agent, or Firm* — McClure, Qualey & Rodack, LLP

(57) ABSTRACT

A specimen inspection machine includes a case, a carrying device, an inspection device, a sensing device and a control device. The carrying device is disposed in the case. The inspection device is disposed on the carrying device. The inspection device has accommodating grooves. Each accommodating groove is used for accommodating an inspection sample. The inspection sample at least includes a specimen. The sensing device is disposed in the case on a side of the case opposite the carrying device. The sensing device senses the inspection device to generate first and second sensing signals. The control device is disposed in the case. The control device determines whether the inspection device is disposed in the correct position according to the first sensing signals, and determines whether inspection samples are placed in the accommodating grooves according to the second sensing signals to inspect the accommodating grooves placed with the inspection samples.

13 Claims, 6 Drawing Sheets

(56) References Cited

U.S. PATENT DOCUMENTS

| | | | |
|---|---|---|---|
| 2015/0031136 A1* | 1/2015 | Gwon | G01N 21/8483 422/68.1 |
| 2015/0041643 A1* | 2/2015 | Li | H01J 37/1471 250/307 |
| 2015/0045930 A1 | 2/2015 | Wang et al. | |
| 2015/0122993 A1* | 5/2015 | Noji | H01J 37/28 250/307 |
| 2016/0178624 A1* | 6/2016 | Lesser | G01N 33/54313 506/40 |

FOREIGN PATENT DOCUMENTS

| | | | |
|---|---|---|---|
| CN | 104345314 A | | 2/2015 |
| TW | M516700 U | * | 2/2016 |
| TW | M516700 U | | 2/2016 |
| WO | 2016/168076 A9 | | 10/2016 |

* cited by examiner

SPECIMEN INSPECTION MACHINE AND OPERATION METHOD THEREOF

CROSS REFERENCE TO RELATED APPLICATIONS

This application claims priority of Taiwan Patent Application No. 109100267, filed on Jan. 6, 2020, the entirety of which is incorporated by reference herein.

BACKGROUND OF THE INVENTION

Field of the Invention

An embodiment of the present invention relates to an inspection machine, and in particular it relates to a specimen inspection machine and an operation method thereof.

Description of the Related Art

Generally, when a user uses a specimen inspection machine to inspect a specimen, the user operates the human-machine interface provided by the specimen inspection machine to select accommodating grooves to be inspected on the inspection device, such that the specimen inspection machine inspects the specimen of the selected accommodating grooves. However, since the selection of the accommodating grooves to be inspected on the inspection device is a manual operation, if the user makes a wrong selection, it may lead to the loss of the specimen and the failure of the specimen inspection process.

In addition, after the user places the inspection device into the specimen inspection machine, the specimen inspection machine may only detect whether the inspection device is placed, but the specimen inspection machine may not confirm that the inspection device is placed properly. However, if the inspection device is not placed properly, when the specimen inspection machine performs a drainage operation, the inspection magnetic beads in the accommodating grooves may be sucked away, causing the loss of the specimen and the failure of the specimen-inspection procedure. Furthermore, the specimen inspection machine does not have a mechanism for detecting the buffer fluid injection tube. That is, when the buffer fluid injection tube is blocked, the specimen-inspection procedure may fail.

Therefore, how to effectively avoid a failure of the specimen-inspection procedure using the specimen inspection machine and how to increase the convenience of use has become an important issue.

BRIEF SUMMARY OF THE INVENTION

An embodiment of the present invention provides a specimen inspection machine and an operation method thereof, thereby effectively avoiding the failure of the specimen-inspection procedure and increasing the convenience of use.

An embodiment of the present invention provides a specimen inspection machine, which includes a case, a carrying device, an inspection device, a sensing device and a control device. The carrying device is disposed in the case. The inspection device is disposed on the carrying device. The inspection device has a plurality of accommodating grooves, each of the accommodating grooves is used for accommodating an inspection sample, and the inspection sample at least includes a specimen. The sensing device is disposed in the case and is disposed on a side of the case opposite the carrying device. The sensing device senses the inspection device to generate a plurality of first sensing signals and a plurality of second sensing signals. The control device is disposed in the case. The control device receives the first sensing signals and the second sensing signals. The control device determines whether the inspection device is disposed in the correct position according to the first sensing signals. The control device determines whether inspection samples are placed in the accommodating grooves according to the second sensing signals to inspect the accommodating grooves placed with the inspection samples.

In addition, an embodiment of the present invention provides an operation method of a specimen inspection machine, which includes the following steps. An inspection device is disposed on a carrying device, wherein the inspection device has a plurality of accommodating grooves, each of the accommodating grooves is used for accommodating an inspection sample, and the inspection sample at least includes a specimen. A sensing device is used to sense the inspection device, so as to generate a plurality of first sensing signals, wherein the sensing device is disposed opposite the carrying device. A control device is used to receive the first sensing signals and determine whether the inspection device is disposed in the correct position according to the first sensing signals. The sensing device is used to sense the inspection device, so as to generate a plurality of second sensing signals. The control device is used to receive the second sensing signals, determine whether inspection samples are placed in the accommodating grooves according to the second sensing signals, and inspect the accommodating grooves placed with the inspection samples.

According to the specimen inspection machine and the operation method thereof disclosed by the embodiment of the present invention, the sensing device senses the inspection device disposed on the carrying device to generate the first sensing signals, and the control device determines whether the inspection device is disposed in the correct position according to the first sensing signals. The sensing device senses the inspection device to generate the second sensing signals, and the control device determines whether inspection samples are placed in the accommodating grooves according to the second sensing signals to inspect the accommodating grooves placed with the inspection samples. Therefore, the failure of the specimen-inspection procedure may be effectively avoided, and the convenience of use is increased.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In each of the following embodiments, the same reference number represents the same or similar element or component.

Figure 1:
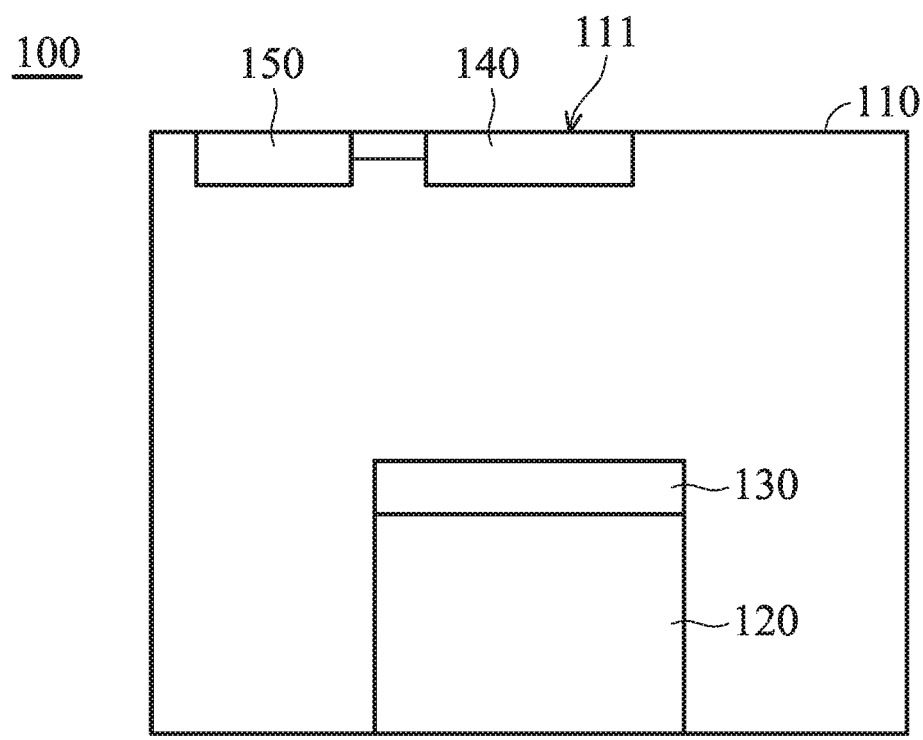
FIG. 1 is a schematic view of a specimen inspection machine according to an embodiment of the present invention.

FIG. 1 is a schematic view of a specimen inspection machine according to an embodiment of the present invention. In the embodiment, the specimen inspection machine 100 is, for example, a beads washing machine, so as to inspect at least one specimen. For example, a copy, an extraction, a washing of inspecting deoxyribonucleic acid (DNA) is performed on the specimen. Please refer to FIG. 1. The specimen inspection machine 100 includes a case 110, a carrying device 120, an inspection device 130, a sensing device 140 and a control device 150.

Figure 2:
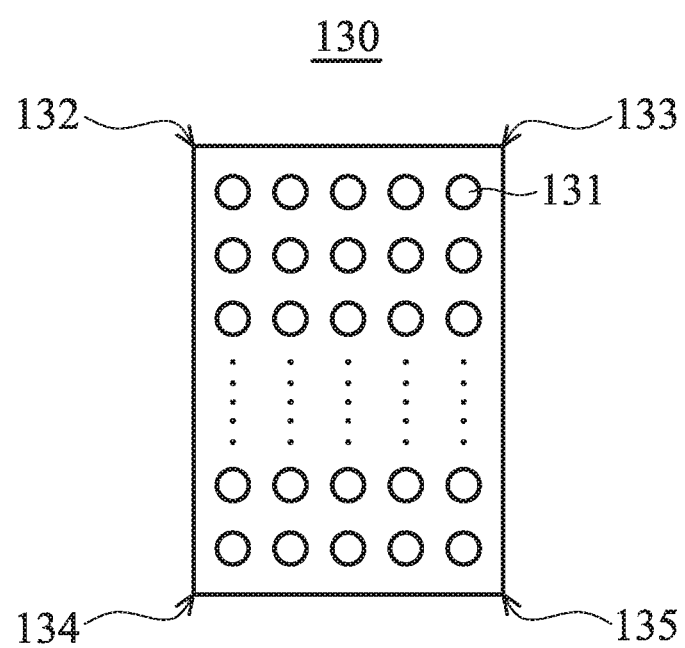
FIG. 2 is a schematic view of an inspection device according to an embodiment of the present invention.

The carrying device 120 is disposed in the case 110. The inspection device 130 is disposed on the carrying device 120. In the embodiment, the inspection device 130 has a plurality of accommodating grooves 131, as shown in FIG. 2. In addition, each of the accommodating grooves 131 is used for accommodating an inspection sample, wherein the inspection sample may include a specimen, a buffer fluid and a plurality of inspection magnetic beads.

In the embodiment, the above specimen is, for example, blood, saliva, or body tissue containing DNA. The buffer fluid is, for example, a solution containing salts. The inspection magnetic beads may be configured with inspection barcodes. The user may know the inspection state of the specimen according to the appearance of the inspection barcodes on the inspection magnetic beads.

That is, the user may place the specimen to be inspected and the inspection magnetic beads in the corresponding accommodating groove 131, and inject the buffer fluids in the corresponding accommodating groove 131. Then, the inspection device 130 is placed on the carrying device 120 in the specimen inspection machine 100, so as to inspect the inspection samples of the accommodating grooves 131.

The sensing device 140 is disposed in the case 110 and disposed on a side 111 of the case 110 opposite to the carrying device 120. The sensing device 140 senses the inspection device 130 to generate a plurality of first sensing signals and a plurality of second sensing signals.

In the embodiment, the sensing device 140 is, for example, an infrared light image sensor or a digital light source image sensor, but the embodiment of the present invention is not limited thereto. The sensing device 140 has a function of time of flight. For example, the sensing device 140 may emit an infrared light or a digital light to the inspection device 130, and receive a reflected light generated by the inspection device 130 reflecting the infrared light or the digital light.

Then, the sensing device 140 may calculate a distance between the sensing device 140 and the inspection device according to an emitting time of emitting the infrared light or the digital light and a receiving time of receiving the reflected light, so as to generate the corresponding sensing signal. That is, when a difference between the emitting time and the receiving time is small, it indicates that the distance between the sensing device 140 and the inspection device 130 is short. When the difference between the emitting time and the receiving time is large, it indicates that the distance between the sensing device 140 and the inspection device 130 is long.

Furthermore, the sensing device 140 senses four corners 132, 133, 134 and 135 (as shown in FIG. 2) of the inspection device 130 to generate a plurality of the first sensing signals. In addition, the sensing device 140 senses the accommodating grooves 131 of the inspection device 130 to generate a plurality of second sensing signals.

The control device 150 is disposed in the case 110 and is coupled to the sensing device 140. In FIG. 1, the position of the control device 150 is only schematic, but the disposing position of the control device 150 is not limited thereto. In some embodiments, the control device 150 may be disposed on the carrying device 120 or disposed in the carrying device 120, and the same effect may be achieved. The control device 150 may receive the first sensing signals and the second sensing signals generated by the sensing device 140. In the embodiment, the control device 150 may receive the first sensing signals and the second sensing signals generated by the sensing device 140 through a wired manner or a wireless manner.

Then, the control device 150 may determine whether the inspection device 130 is disposed in the correct position according to the first sensing signals. Furthermore, the control device 150 may determine whether image depths corresponding to the four corners 132, 133, 134 and 135 of the inspection device 130 are equal to a predetermined depth according to the first sensing signals. That is, the control device 150 may determine whether distances between the sensing device 140 and the four corners 132, 133, 134 and 135 of the inspection device 130 are the same.

When the control device 150 determines that the image depths corresponding to the four corners 132, 133, 134 and 135 of the inspection device 130 are equal to the predetermined depth, the control device 150 determines that the inspection device 130 is disposed in the correct position. It indicates that the distances between the sensing device 140 and the four corners 132, 133, 134 and 135 of the inspection device 130 are the same. That is, the inspection device 130 is stably disposed on the carrying device 120.

When the control device 150 determines that the image depths corresponding to the four corners 132, 133, 134 and 135 of the inspection device 130 are not equal to the predetermined depth, the control device 150 determines that the inspection device 130 is not disposed in the correct position. It indicates that the distances between the sensing device 140 and the four corners 132, 133, 134 and 135 of the inspection device 130 are different. That is, the inspection device 130 is not stably disposed on the carrying device 120. Then, the control device 150 generates, for example, a warning signal.

Afterward, the warning signal may be transmitted to a sound device (such as a buzzer or a speaker), such that the sound device generates a sound. Alternatively, the warning signal may be transmitted to a display device (such as a display), such that the display device displays the warning signal. Accordingly, the user may adjust the disposing position of the inspection device 130 according to the warning signal. Therefore, the failure of the specimen-inspection procedure may be effectively avoided, and the convenience of use is increased.

Afterward, the control device 150 may determine whether inspection samples are placed in the accommodating grooves 131 according to the second sensing signals to inspect the accommodating grooves 131 placed with the inspection samples. Furthermore, the control device 150 determines whether the liquid surface heights of the accommodating grooves 131 are less than or equal to the predetermined liquid surface height according to the second sensing signals. In the embodiment, the liquid surface height is, for example, a distance between the sensing device 140 and the predetermined liquid surface.

When determining that the liquid surface heights of the accommodating grooves 131 are less than or equal to the predetermined liquid surface height, it indicates that the accommodating grooves 131 are placed with the inspection samples, and the control device 150 may determine that the inspection samples are placed in the accommodating grooves 131. Then, the control device 150 may inspect the accommodating grooves 131 placed with the inspection samples.

When determining that the liquid surface heights of the accommodating grooves 131 are not less than or are not equal to the predetermined liquid surface height, it indicates that the accommodating grooves are not placed with the inspection samples, and the control device 150 may not inspects the accommodating grooves 131 that are not placed with the inspection samples. Therefore, the failure of the specimen-inspection procedure caused by the human misoperation may be effectively avoided, and the convenience of use is increased.

Figure 3A:
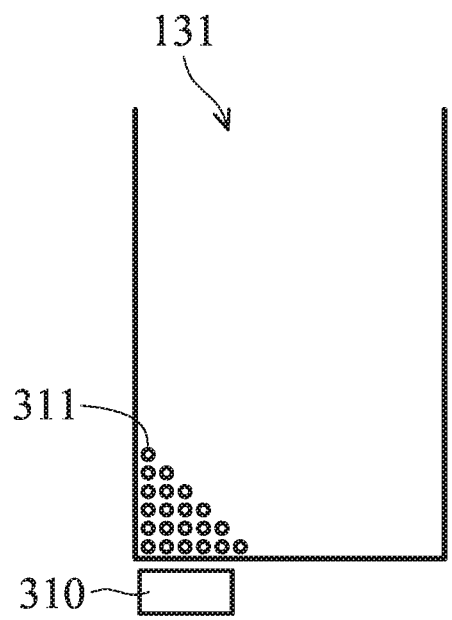
FIGS. 3A and 3B are a schematic view of a corresponding relationship of an accommodating groove and a plurality of magnetic elements according to an embodiment of the present invention.
Figure 3B:
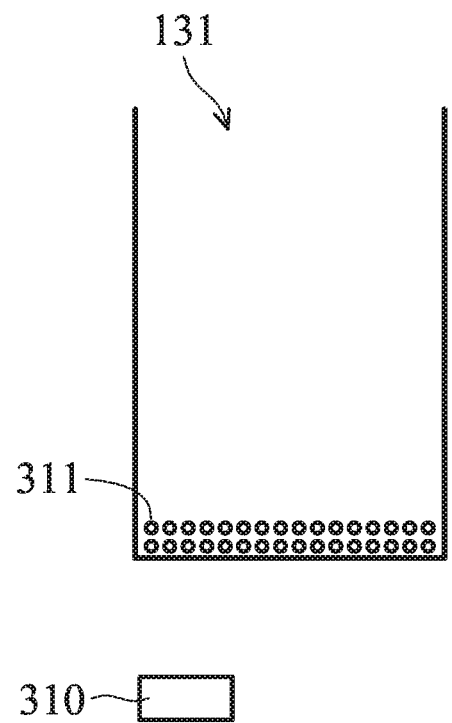

In addition, the specimen inspection machine 100 further includes a plurality of magnetic elements 310. The magnetic elements 310 are movably disposed adjacent to the bottoms of the accommodating grooves 131, as shown in FIG. 3A and FIG. 3B. In the embodiment, the magnetic elements 310 are, for example, a magnet. In addition, the above magnetic elements 310 may be disposed, for example, in the inspection device 130 or the carrying device 120.

During the inspection process of the specimen inspection machine 100, the specimen inspection machine 100 may performs a drainage operation on the accommodating grooves 131. That is, the liquids in the accommodating grooves 131 are drained. Then, a buffer fluid injection device (not shown) of the specimen inspection device 100 injects the buffer fluids into the accommodating grooves 131. Afterward, the above drainage operation and the injection operation are repeated several times to complete the inspection of the inspection samples.

Before performing the drainage operation on the accommodating grooves 131, the magnetic elements 310 may be moved closer to the bottom of the accommodating grooves 131, as shown in FIG. 3A. Therefore, the magnetic elements 310 may attract the inspection magnetic beads 311 of the accommodating grooves 131, so as to avoid the failure of the specimen inspection due to the suction of the inspection magnetic beads by a drainage device during the drainage operation. In addition, after the drainage operation, the magnetic elements 310 may be moved away from the bottom of the accommodating grooves 131, as shown in FIG. 3B. Therefore, the magnetic elements 310 may not attract the inspection magnetic beads 311 of the accommodating grooves 131.

In addition, after the accommodating grooves 131 placed with the inspection samples are inspected, when buffer fluids are injected into the accommodating grooves 131 placed with the inspection samples, the sensing device 140 may sense the accommodating grooves 131 to generate a plurality of third sensing signals. Then, the control device 150 may receive the third sensing signals through the wired manner or the wireless manner. Afterward, the control device 150 may determine whether the liquid surface heights of the accommodating grooves 131 are less than or equal to the predetermined liquid surface height according to the third sensing signals.

When determining that the liquid surface heights of the accommodating grooves 131 are less than or equal to the predetermined liquid surface height, it indicates that the buffer fluids are successfully injected into the accommodating grooves 131, and the control device 150 may determine that the buffer fluid injection device of the specimen inspection device 100 is normal. Then, the above drainage operation and the injection operation may be repeated several times to complete the inspection of the inspection samples.

When determining that the liquid surface heights of the accommodating grooves 131 are not less than or are not equal to the predetermined liquid surface height, it indicates that the buffer fluids are not successfully injected into the accommodating grooves 131, and the control device 150 may determine that the buffer fluid injection device is abnormal. That is, the pipeline of the buffer fluid injection device may be blocked. Then, the control device 150 may generate an abnormal signal.

Afterward, the abnormal signal may be transmitted to the sound device (such as the buzzer or the speaker), such that the sound device generates the sound. Alternatively, the abnormal signal may be transmitted to the display device (such as the display), such that the display device displays the abnormal signal. Accordingly, the user may maintain or repair the buffer fluid injection device according to the abnormal signal. Therefore, the failure of the specimen-inspection procedure may be effectively avoided, and the convenience of use is increased.

Figure 4:
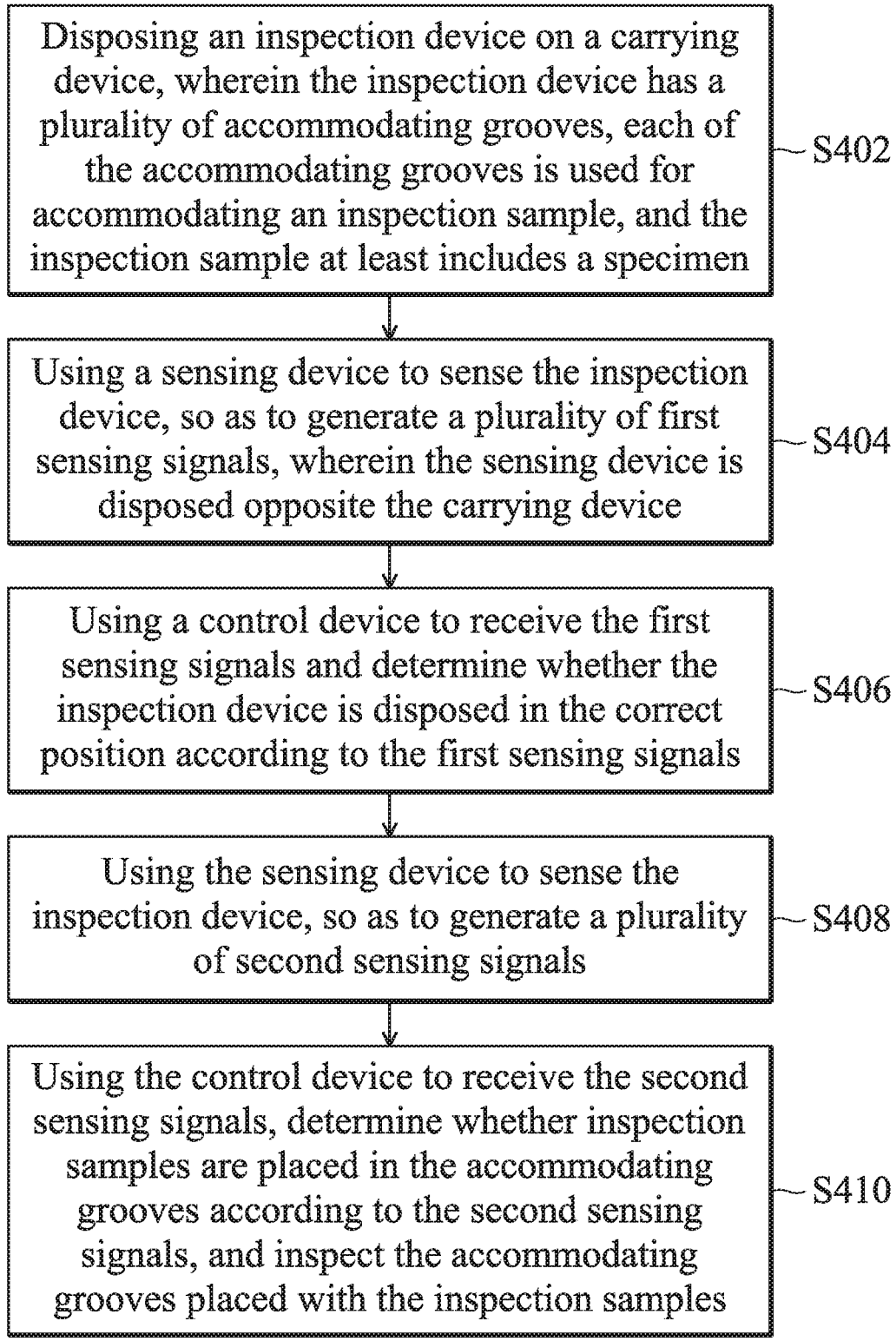
FIG. 4 is a flowchart of an operation method of a specimen inspection machine according to an embodiment of the present invention.

According to the description above, the embodiment of the present invention additionally provides an operation method of a specimen inspection machine. FIG. 4 is a flowchart of an operation method of a specimen inspection machine according to an embodiment of the present invention. In step S402, the method involves disposing an inspection device on a carrying device, wherein the inspection device has a plurality of accommodating grooves, each of the accommodating grooves is used for accommodating an inspection sample, and the inspection sample at least includes a specimen.

In step S404, the method involves using a sensing device to sense the inspection device, so as to generate a plurality of first sensing signals, wherein the sensing device is disposed opposite the carrying device. In step S406, the method involves using a control device to receive the first sensing signals and determine whether the inspection device is disposed in the correct position according to the first sensing signals.

In step S408, the method involves using the sensing device to sense the inspection device, so as to generate a plurality of second sensing signals. In step S410, the method involves using the control device to receive the second sensing signals, determine whether inspection samples are placed in the accommodating grooves according to the second sensing signals, and inspect the accommodating grooves placed with the inspection samples. In the embodiment, the sensing device is, for example, an infrared light image sensor or a digital light source image sensor.

Figure 5:
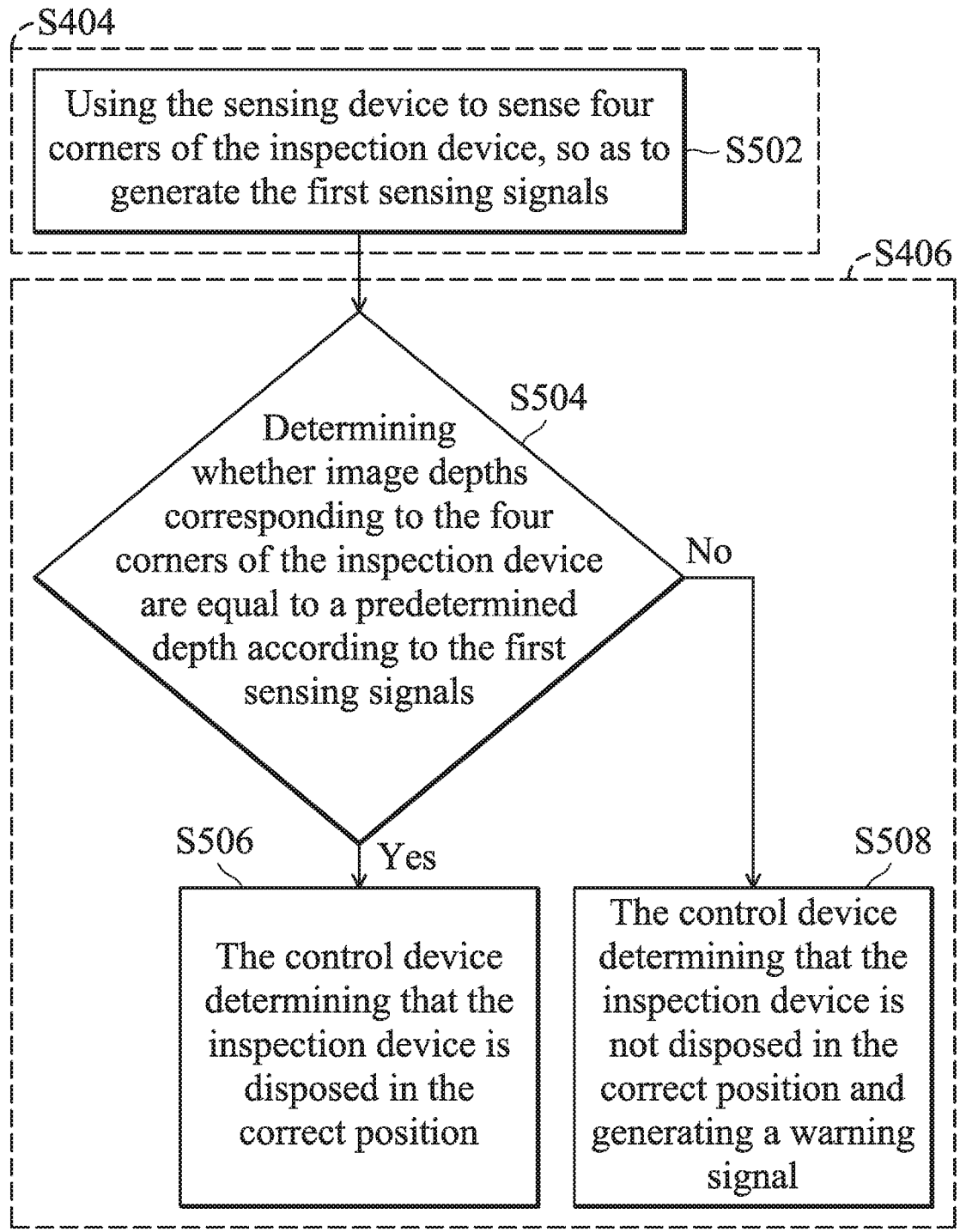
FIG. 5 is a detailed flowchart of step S404 and step S406 in FIG. 4.

FIG. 5 is a detailed flowchart of step S404 and step S406 in FIG. 4. In step S502, the method involves using the sensing device to sense four corners of the inspection device, so as to generate the first sensing signals. In step S504, the method involves determining whether image depths corresponding to the four corners of the inspection device are equal to a predetermined depth according to the first sensing signals. When determining that the image depths corresponding to the four corners of the inspection device are equal to the predetermined depth, the method performs step S506. In step S506, the method involves the control device determining that the inspection device is disposed in the correct position. When determining that the image depths corresponding to the four corners of the inspection device are not equal to the predetermined depth, the method performs step S508. In step S508, the method involves the control device determining that the inspection device is not disposed in the correct position and generating a warning signal.

Figure 6:
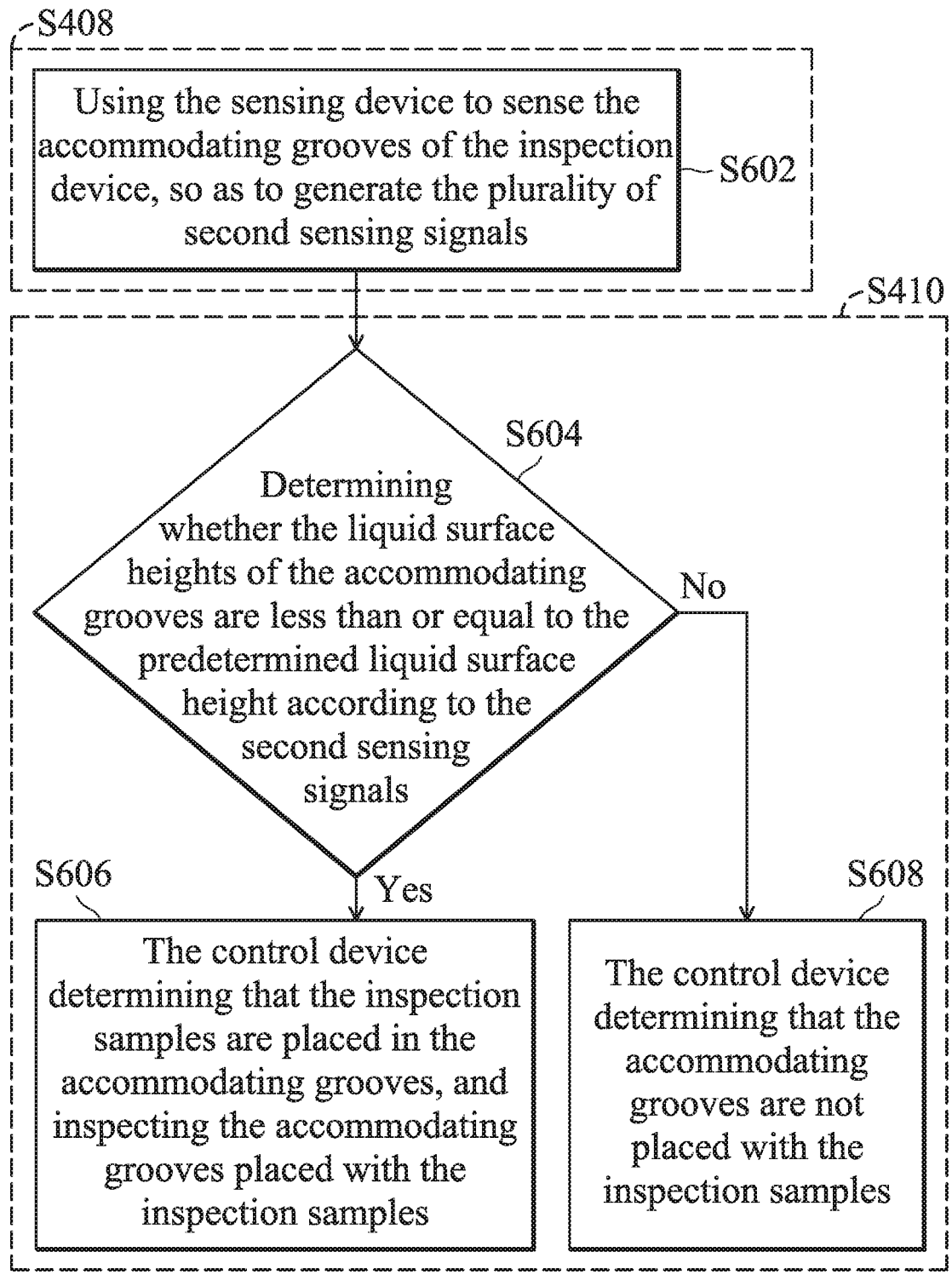
FIG. 6 is a detailed flowchart of step S408 and step S410 in FIG. 4.

FIG. 6 is a detailed flowchart of step S408 and step S410 in FIG. 4. In step S602, the method involves using the sensing device to sense the accommodating grooves of the inspection device, so as to generate the plurality of second sensing signals. In step S604, the method involves determining whether the liquid surface heights of the accommodating grooves are less than or equal to the predetermined liquid surface height according to the second sensing signals.

When determining that the liquid surface heights of the accommodating grooves are less than or equal to the predetermined liquid surface height, the method performs step S606. In step S606, the method involves the control device determining that the inspection samples are placed in the accommodating grooves, and inspecting the accommodating grooves placed with the inspection samples. When determining that the liquid surface heights of the accommodating grooves are not less than or are not equal to the predetermined liquid surface height, the method performs step S608. In step S608, the method involves the control device determining that the accommodating grooves are not placed with the inspection samples.

Figure 7:
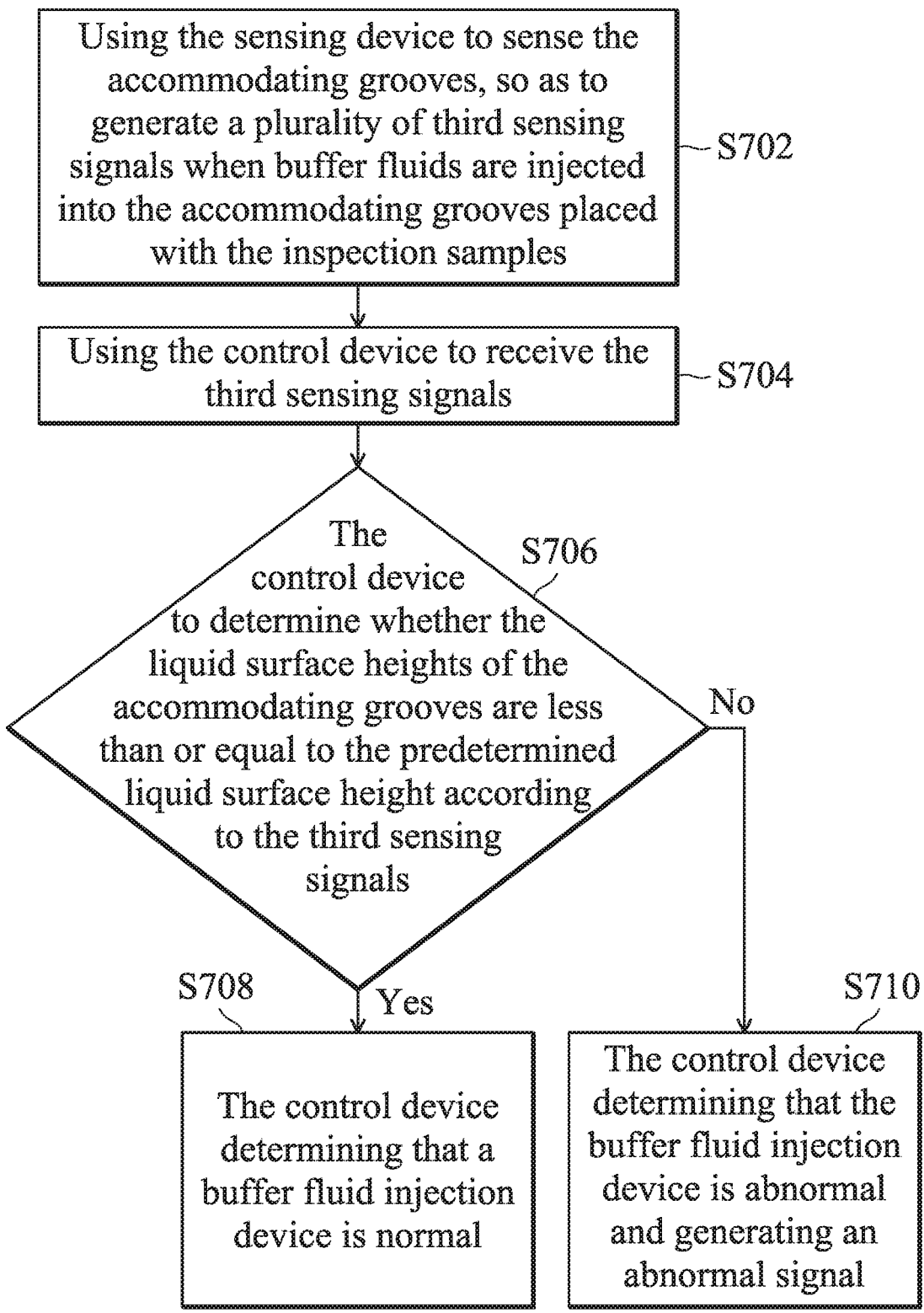
FIG. 7 is a flowchart of an operation method of a specimen inspection machine according to another embodiment of the present invention.

FIG. 7 is a flowchart of an operation method of a specimen inspection machine according to another embodiment of the present invention. FIG. 7 is continued following step S410 of FIG. 4. In step S702, the method involves using the sensing device to sense the accommodating grooves, so as to generate a plurality of third sensing signals when buffer fluids are injected into the accommodating grooves placed with the inspection samples. In step S704, the method involves using the control device to receive the third sensing signals.

In step S706, the method involves using the control device to determine whether the liquid surface heights of the accommodating grooves are less than or equal to the predetermined liquid surface height according to the third sensing signals. When determining that the liquid surface heights of the accommodating grooves are less than or equal to the predetermined liquid surface height, the method performs step S708. In step S708, the method involves the control device determining that a buffer fluid injection device is normal. When the determining that the liquid surface heights of the accommodating grooves are not less than or are not equal to the predetermined liquid surface height, the method performs step S710. In step S710, the method involves the control device determining that the buffer fluid injection device is abnormal and generating an abnormal signal.

In summary, according to the specimen inspection machine and the operation method thereof disclosed by the embodiment of the present invention, the sensing device senses the inspection device disposed on the carrying device to generate the first sensing signals, and the control device determines whether the inspection device is disposed in the correct position according to the first sensing signals. The sensing device senses the inspection device to generate the second sensing signals, and the control device determines whether inspection samples are placed in the accommodating grooves according to the second sensing signals to inspect the accommodating grooves placed with the inspection samples. In addition, when the buffer fluids are injected into the accommodating grooves placed with the inspection samples, the sensing device may further sense the accommodating grooves to generate the third sensing signals, and the control device determines whether the buffer fluid injection device of the specimen inspection device is normal according to the third sensing signals. Therefore, the failure of the specimen-inspection procedure may be effectively avoided, and the convenience of use is increased.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A specimen inspection machine, comprising:
    a case;
    a carrier, disposed in the case;
    an inspection device, disposed on the carrier, wherein the inspection device has a plurality of accommodating grooves, each of the accommodating grooves is used for accommodating an inspection sample, and the inspection sample at least comprises a specimen and a plurality of inspection magnetic beads, wherein the inspection magnetic beads are configured with inspection barcodes;
    a sensor, disposed in the case and disposed on a side of the case opposite the carrier, wherein the sensor senses the inspection device to generate a plurality of first sensing signals and a plurality of second sensing signals; and
    a controller, disposed in the case, wherein the controller device receives the first sensing signals and the second sensing signals, determines whether the inspection device is disposed in a correct position according to the first sensing signals, and determines whether inspection samples are placed in the accommodating grooves according to the second sensing signals to inspect the accommodating grooves placed with the inspection samples.

2. The specimen inspection machine as claimed in claim 1, wherein the sensor is an infrared light image sensor or a digital light source image sensor.

3. The specimen inspection machine as claimed in claim 1, wherein the sensor senses four corners of the inspection device to generate the first sensing signals, the controller determines whether image depths corresponding to the four corners of the inspection device are equal to a predetermined depth according to the first sensing signals, and when the controller determines that the image depths corresponding to the four corners of the inspection device are equal to the predetermined depth, the controller determines that the inspection device is disposed in the correct position, and when the controller determines that the image depths corresponding to the four corners of the inspection device are not equal to the predetermined depth, the controller determines that the inspection device is not disposed in the correct position and generates a warning signal.

4. The specimen inspection machine as claimed in claim 1, wherein the sensor senses the accommodating grooves of the inspection device to generate the second sensing signals, the controller determines whether liquid surface heights of the accommodating grooves are less than or equal to a predetermined liquid surface height according to the second sensing signals, and when the controller determines that the liquid surface heights of the accommodating grooves are less than or equal to the predetermined liquid surface height, the controller determines that the inspection samples are placed in the accommodating grooves, and inspects the accommodating grooves placed with the inspection samples.

5. The specimen inspection machine as claimed in claim 1, wherein the specimen inspection machine further comprises:
  a plurality of magnets, movably disposed adjacent to the bottoms of the accommodating grooves;
  wherein when the magnets are close to the bottoms of the accommodating grooves, the magnets attract the inspection magnetic beads of the accommodating grooves.

6. The specimen inspection machine as claimed in claim 1, wherein after the accommodating grooves placed with the inspection samples are inspected, when buffer fluids are injected into the accommodating grooves placed with the inspection samples, the sensor senses the accommodating grooves to generate a plurality of third sensing signals, the controller receives the third sensing signals and determines whether liquid surface heights of the accommodating grooves are less than or equal to a predetermined liquid surface height according to the third sensing signals, and when the controller determines that the liquid surface heights of the accommodating grooves are less than or equal to the predetermined liquid surface height, the controller determines that a buffer fluid injection tube is normal, and when the controller determines that the liquid surface heights of the accommodating grooves are not less than or are not equal to the predetermined liquid surface height, the controller determines that the buffer fluid injection tube is abnormal and generate an abnormal signal.

7. An operation method of a specimen inspection machine, comprising:
  disposing an inspection device on a carrier, wherein the inspection device has a plurality of accommodating grooves, each of the accommodating grooves is used for accommodating an inspection sample, and the inspection sample at least comprises a specimen and a plurality of inspection magnetic beads, wherein the inspection magnetic beads are configured with inspection barcodes;
  using a sensor to sense the inspection device, so as to generate a plurality of first sensing signals, wherein the sensor is disposed opposite the carrier;
  using a controller to receive the first sensing signals and determine whether the inspection device is disposed in the correct position according to the first sensing signals;
  using the sensor to sense the inspection device, so as to generate a plurality of second sensing signals; and
  using the controller to receive the second sensing signals, determine whether inspection samples are placed in the accommodating grooves according to the second sensing signals, and inspect the accommodating grooves placed with the inspection samples.

8. The operation method of the specimen inspection machine as claimed in claim 7, wherein the sensor is an infrared light image sensor or a digital light source image sensor.

9. The operation method of the specimen inspection machine as claimed in claim 7, wherein the step of using the sensor to sense the inspection device, so as to generate the plurality of first sensing signals, comprises:
  using the sensor to sense four corners of the inspection device, so as to generate the plurality of first sensing signals.

10. The operation method of the specimen inspection machine as claimed in claim 9, wherein the step of using the controller to receive the first sensing signals and determine whether the inspection device is disposed in the correct position according to the first sensing signals comprises:
  determining whether image depths corresponding to the four corners of the inspection device are equal to a predetermined depth according to the first sensing signals;
  the controller determining that the inspection device is disposed in the correct position when determining that the image depths corresponding to the four corners of the inspection device are equal to the predetermined depth; and
  the controller determining that the inspection device is not disposed in the correct position and generating a warning signal when determining that the image depths corresponding to the four corners of the inspection device are not equal to the predetermined depth.

11. The operation method of the specimen inspection machine as claimed in claim 7, wherein the step of using the sensor to sense the inspection device, so as to generate the plurality of second sensing signals, comprises:
  using the sensor to sense the accommodating grooves of the inspection device, so as to generate the plurality of second sensing signals.

12. The operation method of the specimen inspection machine as claimed in claim 11, wherein the step of using the controller to receive the second sensing signals, determine whether inspection samples are placed in the accommodating grooves according to the second sensing signals, and inspect the accommodating grooves placed with the inspection samples comprises:
  determining whether liquid surface heights of the accommodating grooves are less than or equal to a predetermined liquid surface height according to the second sensing signals; and
  the controller determining that the inspection samples are placed in the accommodating grooves, and inspecting the accommodating grooves placed with the inspection samples when determining that the liquid surface heights of the accommodating grooves are less than or equal to the predetermined liquid surface height.

13. The operation method of the specimen inspection machine as claimed in claim 7, further comprising:
  using the sensor to sense the accommodating grooves, so as to generate a plurality of third sensing signals when buffer fluids are injected into the accommodating grooves placed with the inspection samples;
  using the controller to receive the third sensing signals;
  using the controller to determine whether liquid surface heights of the accommodating grooves are less than or equal to a predetermined liquid surface height according to the third sensing signals;
  the controller determining that a buffer fluid injection tube is normal when determining that the liquid surface heights of the accommodating grooves are less than or equal to the predetermined liquid surface height; and the controller determining that the buffer fluid injection tube is abnormal and generating an abnormal signal when the determining that the liquid surface heights of the accommodating grooves are not less than or are not equal to the predetermined liquid surface height.

\* \* \* \* \*